United States Patent [19]
Wade et al.

[11] Patent Number: 6,062,169
[45] Date of Patent: May 16, 2000

[54] DECORATIVE CAT LITTER BOX COVER

[76] Inventors: Margaret P. Wade; Gary N. Wade, both of 4641 Poseidon Pl., Lake Worth, Fla. 33463

[21] Appl. No.: 09/164,652

[22] Filed: Oct. 1, 1998

[51] Int. Cl.[7] .................................................. A01K 29/00
[52] U.S. Cl. .......................... 119/165; 119/470; 119/497
[58] Field of Search ..................................... 119/165, 470, 119/497, 469, 453; D30/161; 150/105, 158, 164, 165

[56] References Cited

U.S. PATENT DOCUMENTS

| | | | |
|---|---|---|---|
| D. 229,653 | 12/1973 | Hendrickson . | |
| D. 393,111 | 3/1998 | Herber | D30/161 |
| 1,015,766 | 1/1912 | Stone . | |
| 4,729,343 | 3/1988 | Evans | 119/482 |
| 4,947,794 | 8/1990 | Baldwin | 119/470 |
| 5,148,774 | 9/1992 | Fields | 119/165 |
| 5,954,014 | 9/1999 | Wamsley | 119/497 |

*Primary Examiner*—Peter M. Poon
*Assistant Examiner*—Yvonne R. Abbott

[57] ABSTRACT

A cat litter box cover system is provided including a rigid litter box. Also included is a flexible cover with a cut out formed on a top face thereof for passing a handle of the litter box and an opening for alignment with an entrance of the litter box.

9 Claims, 2 Drawing Sheets

DECORATIVE CAT LITTER BOX COVER

BACKGROUND OF THE INVENTION

1. Field of the Invention

The present invention relates to litter boxes and more particularly pertains to a new decorative cat litter box cover for covering cat litter boxes of various sizes in a decorative manner.

2. Description of the Prior Art

The use of litter boxes is known in the prior art. More specifically, litter boxes heretofore devised and utilized are known to consist basically of familiar, expected and obvious structural configurations, notwithstanding the myriad of designs encompassed by the crowded prior art which have been developed for the fulfillment of countless objectives and requirements.

Known prior art litter boxes include U.S. Pat. No. 5,289,800; U.S. Pat. No. 4,111,157; U.S. Pat. No. 3,428,026; U.S. Pat. No. 5,220,885; U.S. Pat. No. 2,790,414; and Foreign Patents WO 89/08387 & WO 96/28015.

In these respects, the decorative cat litter box cover according to the present invention substantially departs from the conventional concepts and designs of the prior art, and in so doing provides an apparatus primarily developed for the purpose of covering cat litter boxes of various sizes in a decorative manner.

SUMMARY OF THE INVENTION

In view of the foregoing disadvantages inherent in the known types of litter boxes now present in the prior art, the present invention provides a new decorative cat litter box cover construction wherein the same can be utilized for covering cat litter boxes of various sizes in a decorative manner.

The general purpose of the present invention, which will be described subsequently in greater detail, is to provide a new decorative cat litter box cover apparatus and method which has many of the advantages of the litter boxes mentioned heretofore and many novel features that result in a new decorative cat litter box cover which is not anticipated, rendered obvious, suggested, or even implied by any of the prior art litter boxes, either alone or in any combination thereof.

To attain this, the present invention is adapted for use with a rigid litter box with a base having a bottom face and a side wall integrally coupled to the bottom face and extending upwardly and outwardly therefrom. The side wall of the base terminates with an upper peripheral lip having an inverted U-shaped configuration, as shown in FIG. 3. The litter box further includes a lid with a top face and a peripheral wall integrally coupled to the top face and depending outwardly downwardly therefrom. The peripheral wall of the lid defines a bottom peripheral edge which is adapted for engaging the upper peripheral lip of the base, thereby defining an interior space. It should be noted that the lid has a rectangular entrance formed on the peripheral wall thereof. Further, a handle is fixedly mounted on a central extent of the top face of the lid. Next provided is a flexible cover constructed from a fabric material. The cover includes a rectangular top face with an X-shaped cut out formed in a central extent thereof. For reasons that will soon become apparent, the cut out is defined by a pair of intersecting linear slots which remain in parallel with an edge of the top face. A pair of wide side faces and a pair of thin side faces are all integrally coupled to the top face of the cover. The side faces depend downwardly from the top face of the cover for defining an interior space and a lower peripheral edge. The cover further has an opening formed in one of the thin side faces adjacent to the lower peripheral edge thereof. The opening includes a linear bottom edge, an arcuate top edge, and a pair of linear side edges. Ideally, the opening has a height approximately ¾ that of the thin side face in which it is formed. In use, the cover is placed over the lid of the litter box such that the handle extends through the cut out. Further, the opening of the cover is aligned with the entrance of the lid of the litter box. A decorative assembly includes a valance depending from the top edge of the opening of the cover a distance about ⅓ a height of the opening. The decorative assembly further includes a pair of curtains. As shown in FIG. 1, such curtains depend from the top edge of the opening and line an entire length of the side edges of the opening of the cover. Mounted along an entire perimeter of the lower peripheral edge of the cover is a thin elastic band. The elastic band is adapted for conforming to the side wall of the base of the litter box below the upper peripheral lip thereof. The elastic band has a height of about ¼ that of the base of the litter box, thereby maintaining the cover in place. See FIG. 3. Finally, a strip of lace is mounted along the entire perimeter of the lower peripheral edge of the cover.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new decorative cat litter box cover apparatus and method which has many of the advantages of the litter boxes mentioned heretofore and many novel features that result in a new decorative cat litter box cover which is not anticipated, rendered obvious, suggested, or even implied by any of the prior art litter boxes, either alone or in any combination thereof.

It is another object of the present invention to provide a new decorative cat litter box cover which may be easily and efficiently manufactured and marketed.

It is a further object of the present invention to provide a new decorative cat litter box cover which is of a durable and reliable construction.

An even further object of the present invention is to provide a new decorative cat litter box cover which is susceptible of a low cost of manufacture with regard to both materials and labor, and which accordingly is then susceptible of low prices of sale to the consuming public, thereby making such decorative cat litter box cover economically available to the buying public.

Still yet another object of the present invention is to provide a new decorative cat litter box cover which provides in the apparatuses and methods of the prior art some of the advantages thereof, while simultaneously overcoming some of the disadvantages normally associated therewith.

Still another object of the present invention is to provide a new decorative cat litter box cover for covering cat litter boxes of various sizes in a decorative manner.

Even still another object of the present invention is to provide a new decorative cat litter box cover that includes a cut out formed on a top face thereof for passing a handle of a litter box and an opening for alignment with an entrance of the litter box.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
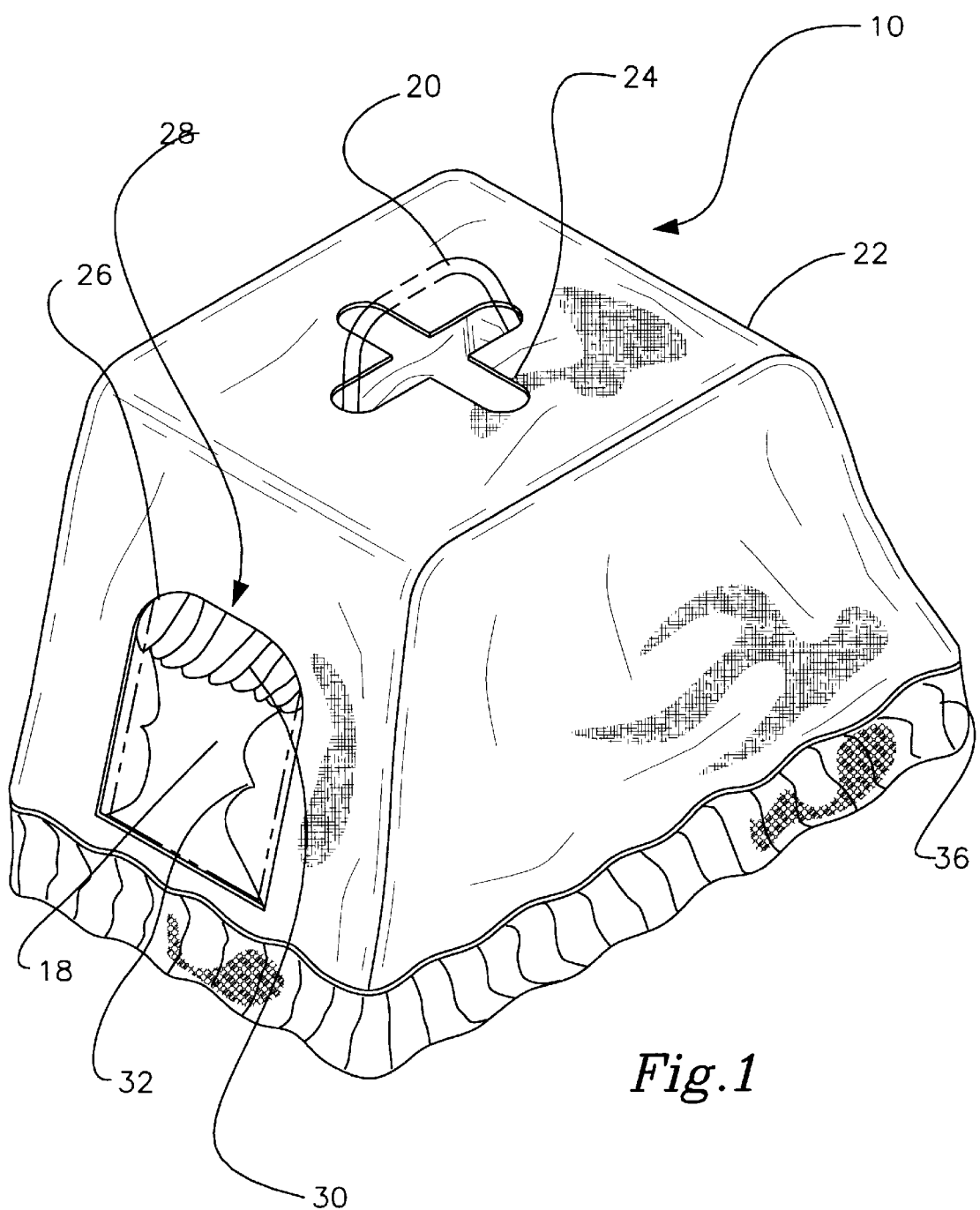
FIG. 1 is a perspective view of a new decorative cat litter box cover according to the present invention.
Figure 2:
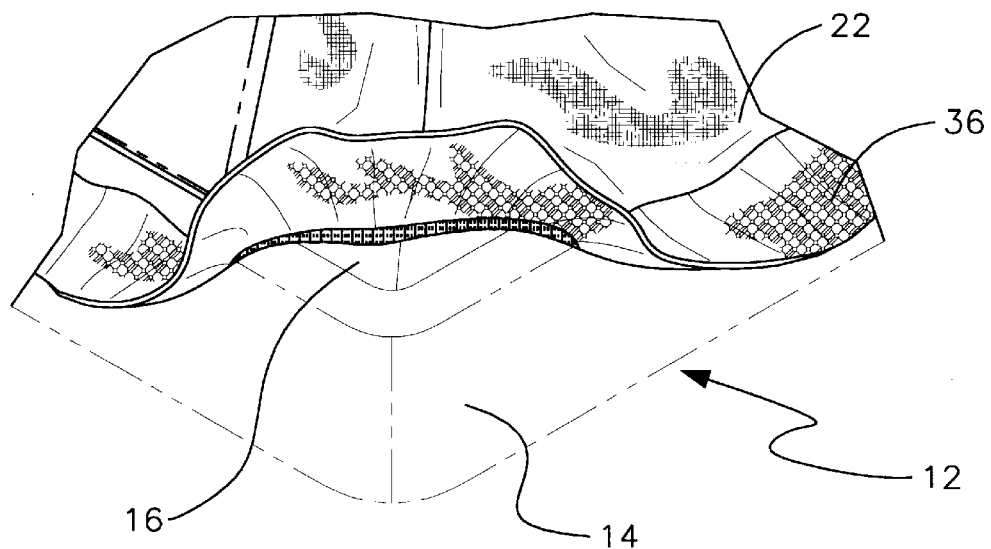
FIG. 2 is a detailed perspective view of a portion of the cover of the present invention.
Figure 3:
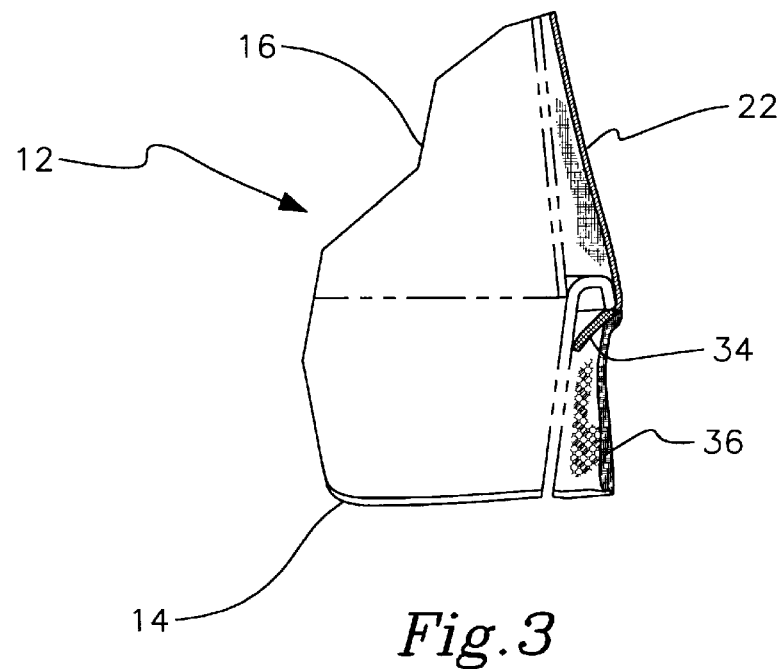
FIG. 3 is a side cross-sectional view of the present invention.

With reference now to the drawings, and in particular to FIGS. 1 through 3 thereof, a new decorative cat litter box cover embodying the principles and concepts of the present invention and generally designated by the reference numeral 10 will be described.

The present invention, designated as numeral 10, is adapted for use with a rigid litter box 12 with a base 14 having a bottom face and a side wall integrally coupled to the bottom face and extending upwardly and outwardly therefrom. The side wall of the base terminates with an upper peripheral lip having an inverted U shaped configuration, as shown in FIG. 3. The litter box further includes a lid 16 with a top face and a peripheral wall integrally coupled to the top face and depending outwardly downwardly therefrom. The peripheral wall of the lid defines a bottom peripheral edge which is adapted for engaging the upper peripheral lip of the base, thereby defining an interior space. It should be noted that the lid has a rectangular entrance 18 formed on the peripheral wall thereof. Further, a handle 20 is fixedly mounted on a central extent of the top face of the lid.

Next provided is a flexible cover 22 constructed from a fabric material. The cover includes a rectangular top face with an X-shaped cut out 24 formed in a central extent thereof. The cut out is defined by a pair of intersecting linear slots which each remain in parallel with one of the edges of the top face. A pair of wide side faces and a pair of thin side faces are all integrally coupled to the top face of the cover. The side faces depend downwardly from the top face of the cover for defining an interior space and a lower peripheral edge.

The cover further has an opening 26 formed in one of the thin side faces adjacent to the lower peripheral edge of the cover. The opening includes a linear bottom edge, an arcuate top edge, and a pair of linear side edges. Ideally, the opening has a height approximately ¾ that of the thin side face in which it is formed. In use, the cover is placed over the lid of the litter box such that the handle extends through the cut out. Such cut out is adapted for receiving lids with handles which extend either longitudinally or laterally along the top face thereof. Further, the opening of the cover is aligned with the entrance of the lid of the litter box during use.

A decorative assembly 28 includes a valance 30 depending from the top edge of the opening of the cover a distance about ⅓ a height of the opening. The decorative assembly further includes a pair of curtains 32. As shown in FIG. 1, such curtains depend from the top edge of the opening and line an entire length of the side edges of the opening of the cover.

Mounted along an entire perimeter of the lower peripheral edge of the cover is a thin elastic band 34. The elastic band is adapted for conforming to the side wall of the base of the litter box below the upper peripheral lip thereof. The elastic band has a height of about ¼ that of the base of the litter box, thereby maintaining the cover in place. See FIG. 3.

Finally, a strip of lace 36 is mounted along the entire perimeter of the lower peripheral edge of the cover. As shown in FIG. 3, the lace remains exterior of and separate from the elastic band. In the preferred embodiment, the lace has a height which is greater than that of the base of the litter box. In addition, the lace has a plurality of evenly spaced pleats. By this structure, the lace permits the cover to be employed on numerous different litter boxes with bases having varying heights and widths.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A cat litter box cover system comprising, in combination:

a rigid litter box including a base having a bottom face and a side wall integrally coupled to the bottom face and extending upwardly and outwardly therefrom to terminate with an upper peripheral lip having an inverted U-shaped configuration, the litter box further including a lid with a top face and a peripheral wall integrally coupled to the top face and depending outwardly downwardly therefrom to define a bottom peripheral edge adapted for engaging the upper peripheral lip of the base thereby defining an interior space, wherein the lid has a rectangular entrance formed on the peripheral wall thereof and a handle fixedly mounted on a central extent of the top face of the lid;

a flexible cover constructed from a fabric material including a rectangular top face with an X-shaped cut out formed in a central extent thereof which is defined by a pair of intersecting linear slots which remain in parallel with an edge of the top face, a pair of wide side faces and a pair of thin side faces all integrally coupled to the top face of the cover and depending downwardly therefrom for defining an interior space and a lower peripheral edge, and an opening formed in one of the thin side faces adjacent to the lower peripheral edge of the cover, the opening including a linear bottom edge, an arcuate top edge, and a pair of linear side edges, wherein the opening has a height approximately ¾ that of the thin side face in which it is formed, wherein the cover is placed over the lid of the litter box such that the handle extends through the cut out and the opening of the cover is aligned with the entrance of the lid of the litter box;

a decorative assembly including a valance depending from the top edge of the opening of the cover a distance about ⅓ a height of the opening, the decorative assembly further including a pair of curtains depending from the top edge of the opening and lining an entire length of the side edges of the opening of the cover;

a thin elastic band mounted along an entire perimeter of the lower peripheral edge of the cover for conforming to the side wall of the base of the litter box below the upper peripheral lip thereof, the elastic band having a height of about ¼ that of the base of the litter box, thereby maintaining the cover in place; and lace mounted along the entire perimeter of the lower peripheral edge of the cover exterior of and separate from the elastic band, the lace having a height which is greater than that of the base of the litter box.

2. A cat litter box cover for covering a rigid litter box with a rigid litter box cover having a carrying handle for permitting lifting of the litter box, comprising:

a flexible cover with an opening for alignment with an entrance of the litter box;

the flexible cover being comprised of a substantially rectangular top panel portion for resting on a top of the litter box cover, the top panel portion having a perimeter with substantially parallel sides and substantially parallel ends, a plurality of side panel portions coupled to the side and ends of the perimeter of the top panel portion for depending from the top panel portion when the cover is placed on the litter box cover; and wherein the top panel portion has a cut out substantially centrally located therein for receiving the carrying handle of the litter box such that the handle may be accessed when the flexible cover is in place on the litter box, the cut out having a cross shape defined by a pair of intersecting linear slots, one of the intersecting linear slots being adapted to receive a handle oriented parallel to the sides of the perimeter of the top panel portion and the other one of the intersecting linear slots being adapted to receive a handle oriented parallel to the ends of the perimeter of the top panel portion.

3. The cat litter box cover system as set forth in claim 2 wherein the cover is formed of a fabric material.

4. The cat litter box cover system as set forth in claim 2 wherein the opening includes a decorative assembly.

5. The cat litter box cover system as set forth in claim 4 wherein the decorative assembly includes a valance.

6. The cat litter box cover system as set forth in claim 4 wherein the decorative assembly includes a pair of curtains.

7. The cat litter box cover system as set forth in claim 2 wherein an elastic band is mounted along a lower peripheral edge of the cover for conforming to the litter box.

8. The cat litter box cover system as set forth in claim 2 wherein a strip of lace is mounted along a lower peripheral edge of the cover.

9. A cat litter box cover system comprising, in combination:

a litter box including a base having a bottom face and a side wall integrally coupled to the bottom face and extending upwardly and outwardly therefrom to terminate with an upper peripheral lip, the litter box further including a lid with a top face and a peripheral wall integrally coupled to the top face and depending outwardly downwardly therefrom to define a bottom peripheral edge adapted for engaging the upper peripheral lip of the base thereby defining an interior space wherein the lid has an entrance formed on the peripheral wall thereof and a handle fixedly mounted on the top face of the lid;

a flexible cover including a top face with an X-shaped cut out formed in a central extent thereof which is defined by a pair of intersecting linear slots which remain in parallel with an edge of the top face, a pair of wide side faces and a pair of thin side faces all integrally coupled to the top face of the cover and depending downwardly therefrom for defining an interior space and a lower peripheral edge, and an opening formed in one of the thin side faces adjacent to the lower peripheral edge of the cover, the opening including a bottom edge, a top edge, and a pair of side edges, wherein the opening is formed in one of the thin side faces, wherein the cover is placed over the lid of the litter box such that the handle extends through the cut out and the opening of the cover is aligned with the entrance of the lid of the litter box;

a decorative assembly including a valance depending from the top edge of the opening of the cover, the decorative assembly further including a pair of curtains depending from the top edge of the opening and lining a length of the side edges of the opening of the cover;

an elastic band mounted along a perimeter of the lower peripheral edge of the cover for conforming to the side wall of the base of the litter box below the upper peripheral lip thereof, thereby maintaining the cover in place; and lace mounted along the perimeter of the lower peripheral edge of the cover exterior of and separate from the elastic band, the lace having a height which is greater than that of the base of the litter box.

* * * * *